US007190670B2

(12) United States Patent
Varsa et al.

(10) Patent No.: US 7,190,670 B2
(45) Date of Patent: Mar. 13, 2007

(54) METHOD AND APPARATUS FOR MULTIMEDIA STREAMING IN A LIMITED BANDWIDTH NETWORK WITH A BOTTLENECK LINK

(75) Inventors: Victor Varsa, Irving, TX (US); David Leon, Irving, TX (US); Durhan Guerrero, Irving, TX (US); Cris Jansson, Lewisville, TX (US)

(73) Assignee: Nokia Corporation, Espoo (FI)

( * ) Notice: Subject to any disclaimer, the term of this patent is extended or adjusted under 35 U.S.C. 154(b) by 438 days.

(21) Appl. No.: 10/265,077

(22) Filed: Oct. 4, 2002

(65) Prior Publication Data

US 2004/0066742 A1 Apr. 8, 2004

(51) Int. Cl.
*H04L 12/00* (2006.01)
*G06F 15/16* (2006.01)
*H04L 12/56* (2006.01)

(52) U.S. Cl. .................. 370/229; 370/352; 370/468; 709/231

(58) Field of Classification Search ............... 370/229, 370/231, 232, 236, 468, 235, 233–234, 352, 370/230; 709/235, 231
See application file for complete search history.

(56) References Cited

U.S. PATENT DOCUMENTS

| 5,768,527 | A | | 6/1998 | Zhu et al. ............... 395/200.61 |
| 6,014,694 | A | * | 1/2000 | Aharoni et al. ............ 709/219 |
| 6,085,252 | A | * | 7/2000 | Zhu et al. .................... 709/231 |
| 6,205,150 | B1 | | 3/2001 | Ruszczyk .................... 370/412 |
| 6,405,256 | B1 | * | 6/2002 | Lin et al. ..................... 709/231 |
| 6,438,141 | B1 | * | 8/2002 | Hanko et al. ............... 370/477 |
| 6,560,243 | B1 | * | 5/2003 | Mogul ......................... 370/468 |
| 6,621,829 | B1 | * | 9/2003 | Achilles et al. ............. 370/468 |
| 6,628,610 | B1 | * | 9/2003 | Waclawsky et al. ........ 370/229 |
| 6,766,376 | B2 | * | 7/2004 | Price ........................... 709/231 |
| 2002/0176361 | A1 | * | 11/2002 | Wu et al. .................... 370/231 |
| 2003/0037158 | A1 | * | 2/2003 | Yano et al. .................. 709/232 |

(Continued)

FOREIGN PATENT DOCUMENTS

EP    1 006 689 A2    6/2000

(Continued)

OTHER PUBLICATIONS

Wang, Xin, et al; "Comparison of Adaptive Internet Multimedia Applications", Jun. 1999; IEICE Transactions on Communications; vol. E82-B; No. 6; pp. 806-818.*

(Continued)

*Primary Examiner*—Seema S. Rao
*Assistant Examiner*—Robert C. Scheibel, Jr.
(74) *Attorney, Agent, or Firm*—Ware, Fressola, Van Der Sluys & Adolphson LLP

(57) ABSTRACT

A method used for communicating packets or other information units from a server (11) to a client (15) over a communication path including a packet scheduler (14-1) followed by a bottleneck path (14-2), with the packet scheduler (14-1) having a buffer for holding packets so as not to transmit over the bottleneck path (14-2) at a rate either too high or too low, the method providing that the server (11) communicate to the client (15) sender information indicating the last packet sent to the client (11) by the server (11) and do so via a mechanism by which the sender information is communicated over the bottleneck path (14-2) ahead of substantially all packets already in the buffer. The client (11) then uses the sender information to provide, as needed, information useful in adapting the rate at which the packets arrive at the packet scheduler (14-1)

20 Claims, 2 Drawing Sheets

U.S. PATENT DOCUMENTS

2003/0103460 A1* 6/2003 Kamath et al. .......... 370/236.2
2003/0198184 A1* 10/2003 Huang et al. ................ 370/231

FOREIGN PATENT DOCUMENTS

| EP | 1 054 544 A2 | 11/2000 |
|---|---|---|
| WO | WO 99/00984 | 1/1999 |
| WO | WO 01/40960 A1 | 6/2001 |

OTHER PUBLICATIONS

Kanakia, Hemant, et al; "An Adaptive Congestion Control Scheme for Real Time Packet Video Transport"; Dec. 1995; Networking, IEEE/ACM Transactions on, vol. 3, Iss. 6; pp. 671-682.*

Li, Xue, et al; "Layered Video Multicast with Retransmission (LVMR): Evaluation of Hierarchical Rate Control"; Mar. 29-Apr. 2, 1998; INFOCOM '98 17th Annual Joint Conference of the IEEE Computer and Communications Societies; pp. 1062-1072.*

McCanne, Steven, et al; "Receiver-Driven Layered Multicast"; Aug. 1996; Conference proceedings on Applications, technologies, architectures, and protocols for computer communications; pp. 117-130.*

Vickers, Brett, et al; "Adaptive Multicast of Multi-Layered Video: Rate-Based and Credit-Based Approaches" ; Mar. 29-Apr. 2, 1998; INFOCOM '98 17th Annual Joint Conference of the IEEE Computer Communications Societies; pp. 1073-1083.*

3GPP2 TSG-P, "CDMA2000 Broadcast Services," Qualcomm, P00-20011015-xxx, Cheju-do, Korea, Oct. 15-19, 2001.

3GPP2-C10-20010917-xxx; "Comments on QUALCOMM's Broadcast Service Stage 2," Nokia; Mark Cheng, et al; Kyoto, Japan; Sep. 17, 2001.

Miyazaki, A., et al; "RTP Retransmission Payload Format", Internet draft, Feb. 2001.

"RTP retransmission framework", Leon, D. et al, Nov. 2001; IETF draft—work in proress.

"An RTP Payload Format for Generic Forward Error Correction", Rosenberg, J., et al. IETF RFC 2733, Dec. 1999.

"Priority Dropping in Network Transmission of Scalable Video", Tian, T., et al; Image Processing, 2000. Proceedings. 2000 International Conference.

"A Simple Loss Differentiation Approach to Layered Multicast", Gopalakrishnan, R., et al.; INFOCOM 2000, Nineteenth Annual Joint Conference of the IEEE Computer and Communication Societies. Proceedings. IEEE, vol. 2, 2000.

3rd Generation Partnership Project; Technical Specification Group Services and System Aspects; Transparent end-to-end packet switched streaming service (PSS); Protocols and codecs (Release 5); 3GPP TS 26.234 V5.0.0 (Mar. 2002); Feb. 2002.

"RTP: A Transport Protocol for Real-Time Applications", Schulzrinne H, et al; Standards Track; Lawrence Berkeley National Laboratory; Jan. 1996.

"Receiver-Driven Layered Multicast", Steven McCanne, et al; Proceedings of ACM SIGCOMM '96; Aug. 1996; Stanford, CA.

Layered Video Multicast with Retransmission (LVMR): Evaluation of Error Recovery Schemes; Xue Li; et al; Network and Operating System Support for Digital Audio and Video, 1997.; Proceedings of the IEEE 7th International Workshop, 1997.

"Extended RTP Profile for RTCP-based Feedback", Ott, J. et al; IETF Internet Draft; Work in Progress; Nov. 2001.

* cited by examiner

METHOD AND APPARATUS FOR MULTIMEDIA STREAMING IN A LIMITED BANDWIDTH NETWORK WITH A BOTTLENECK LINK

FIELD OF THE INVENTION

The invention has to do with wirelessly providing streaming multimedia, and more particularly for doing so over a limited radio bandwidth network, such as in providing streaming multimedia to a mobile terminal having a small bandwidth.

BACKGROUND ART

In wirelessly providing (over a radio access network component of a cellular communication system, also having a core network for connecting to other networks) a multimedia (MM) stream from a streaming server to a streaming client wireless terminal, the communication path between the two may include a path link (segment of the path) that is a bottleneck, usually the path link connecting the radio access network to the wireless terminal streaming client. For example, as shown in FIG. 1, when a video stream from the Internet is to be wirelessly transmitted from a streaming server 11 to a wireless terminal streaming client 15, such as a mobile terminal, various path links are involved, including a core network (path link) 12, and a radio access network (path link) 14, which itself includes elements coupling directly to the core network 12 (i.e. elements on the core network side of the radio access network 14), and also elements on the air interface side of the radio access network, elements that provide the radio link 14-2, a segment (path link) of the overall communication path from the server 11 to the client 15 that generally offers more limited bandwidth than the other path links connecting the server to the client, and so is referred to here as a bottleneck path link. According to the prior art, for the communication path of FIG. 1 including the bottleneck path link 14-2, the multimedia stream is buffered and shaped at a packet scheduler node 13, i.e. the node immediately preceding the bottleneck path link 14-2 in the path leading from the server 11 to the client 15. (In the CDMA-2000 cellular communication system, the packet scheduler would be the base station controller; in UTRAN, it would typically be the radio network controller, or possibly a so-called Node B.) The packet scheduler 13 delays and drops transport packets when necessary in order to fit the stream into the limited bandwidth of the bottleneck path link 14-2, using a scheduling algorithm that provides different levels of service to different priority packets in the input buffer used by the packet scheduler 13.

The amount being held in the buffer of the packet scheduler 13 indicates how well the streaming server is adapting its transmission rate to the bottleneck path link 14-2, and therefore there is in the prior art, as indicated in FIG. 2, a method for measuring the amount being held in the buffer. The measurement is made based on the client (wireless terminal) 15, in response to receiving from the server (11), as a normal priority communication, a sender report indicating the last packet sent, sending a receiver report back to the server (11), usually at regularly scheduled intervals or even in some cases in response to each sender report, the receiver report indicating the last packet it has received (as of some time $t_r$). When the server 11 receives the receiver report (at some later time $t_s$), it computes the number of bytes en route to the terminal (and so not yet received) since it knows the last packet it sent to the client 15 (as of $t_s$), and it provides further packets at a rate that accounts for the buffer size according to its calculation. However, as computed, the number of bytes also includes packets sent during the delay that it takes for the RTCP receiver report to arrive at the server, and is therefore somewhat inaccurate, and, moreover, even though the delay can be estimated via RTCP (real-time control protocol) reports (using a round-trip delay measurement), it can fluctuate. Another factor that influences the accuracy with which the server is able to monitor the bytes in the buffer of the packet scheduler 14-1 is the frequency of the RTCP reports; the more frequent the RTCP reports are sent by the client, the better the reaction-time of the server. But communicating the receiver reports imposes additional load on the radio access network uplink channel 14.

The patent application WO9900984 describes a method where the state of the buffer (indicating the size of its contents) and network congestion is evaluated using the receiver reports from the terminal.

What is needed is a way to provide good end-to-end quality of service for a streaming application, while addressing the prior art inaccuracies of the buffer content size calculations and the uplink load imposed on the radio access network.

SUMMARY OF THE INVENTION

Accordingly, the present invention provides a method for communicating information units from a server to a client over a communication path leading from the server to the client and including a packet scheduler followed by a bottleneck link path, with the packet scheduler having a buffer for holding information units as needed, characterized by: the server communicating, to the client, sender information indicating the last information unit sent to the client and doing so via a mechanism by which the sender information is communicated over the bottleneck path link ahead of all or substantially all information units already in the buffer of the packet scheduler; performing a buffer-size calculation, using the sender information, to estimate the number of information units in the buffer; and communicating over the bottleneck path link information useful in effecting rate adaptation to control the number of information units in the buffer.

In accord with the first aspect of the invention, the client may perform the buffer size calculation and may also communicate over the bottleneck path link the information useful in effecting rate adaptation.

Also in accord with the first aspect of the invention, the step of communicating over the bottleneck path link information useful in effecting rate adaptation may be performed depending on whether or not the buffer-size calculation indicates that the buffer size is outside of predetermined limits.

Still also in accord with the first aspect of the invention, the mechanism by which the sender information is communicated over the bottleneck path link may result in the sender information being communicated ahead of all information units already in the buffer of the packet scheduler except for the next unit of information in the buffer already scheduled to be communicated over the bottleneck path link at the time of arrival of the sender information.

Even still also in accord with the first aspect of the invention, the information useful in effecting rate adaptation may indicate at least either rate adaptation commands or the last information unit received or the buffer size or sessions to which the client is to be made a subscriber.

And still even also in accord with the first aspect of the invention, the server may use the rate adaptation information to determine an estimate of the time for an information unit to reach the client over the bottleneck path link after being transmitted from the server.

In a second aspect of the invention, a server is provided with operability corresponding to the steps performed by a server according to the first aspect of the invention.

In a third aspect of the invention, a client is provided with operability corresponding to the steps performed by a client according to the first aspect of the invention.

In a fourth aspect of the invention, a system is provided including a server, a client, a packet scheduler and a bottleneck path link, the system for communicating information units from the server to the client over a communication path leading from the server to the client and including the packet scheduler followed by the bottleneck link path, with the packet scheduler having a buffer for holding information units as needed, and with the client and server each having operability as set out according to the first aspect of the invention.

In a fifth aspect of the invention, a computer program is provided having instructions for a server so as to impart to the server operability as set out for a server according to the second aspect of the invention.

In a sixth aspect of the invention, a computer program is provided having instructions for a client so as to impart to the client operability as set out for a client according to the third aspect of the invention.

In a seventh aspect of the invention, a computer program is provided having instructions for a system so as to impart to the system operability as set out for a system according to the fourth aspect of the invention.

Thus, the invention provides a packet scheduler buffer content size measurement method utilizing a delay-prioritized scheduler algorithm yielding good end-to-end quality of service for the streaming application, while addressing the prior art inaccuracies of the buffer content size calculations and the uplink load imposed on the radio access network. The invention makes the buffer measurements of the packet scheduler more reliable (more accurate) and causes less communication traffic between the wireless client and the streaming server, i.e. imposes less load on the radio access network providing part of the communication path between the wireless client and the streaming server.

BRIEF DESCRIPTION OF THE DRAWINGS

The above and other objects, features and advantages of the invention will become apparent from a consideration of the subsequent detailed description presented in connection with accompanying drawings, in which:

FIG. 4 is a block diagram illustrating an embodiment of the invention in which a personal computer functions as the server and a peripheral device (such as a headset) wirelessly connected to the personal computer functions as the client.

A DESCRIPTION OF THE INVENTION

Figure 1:
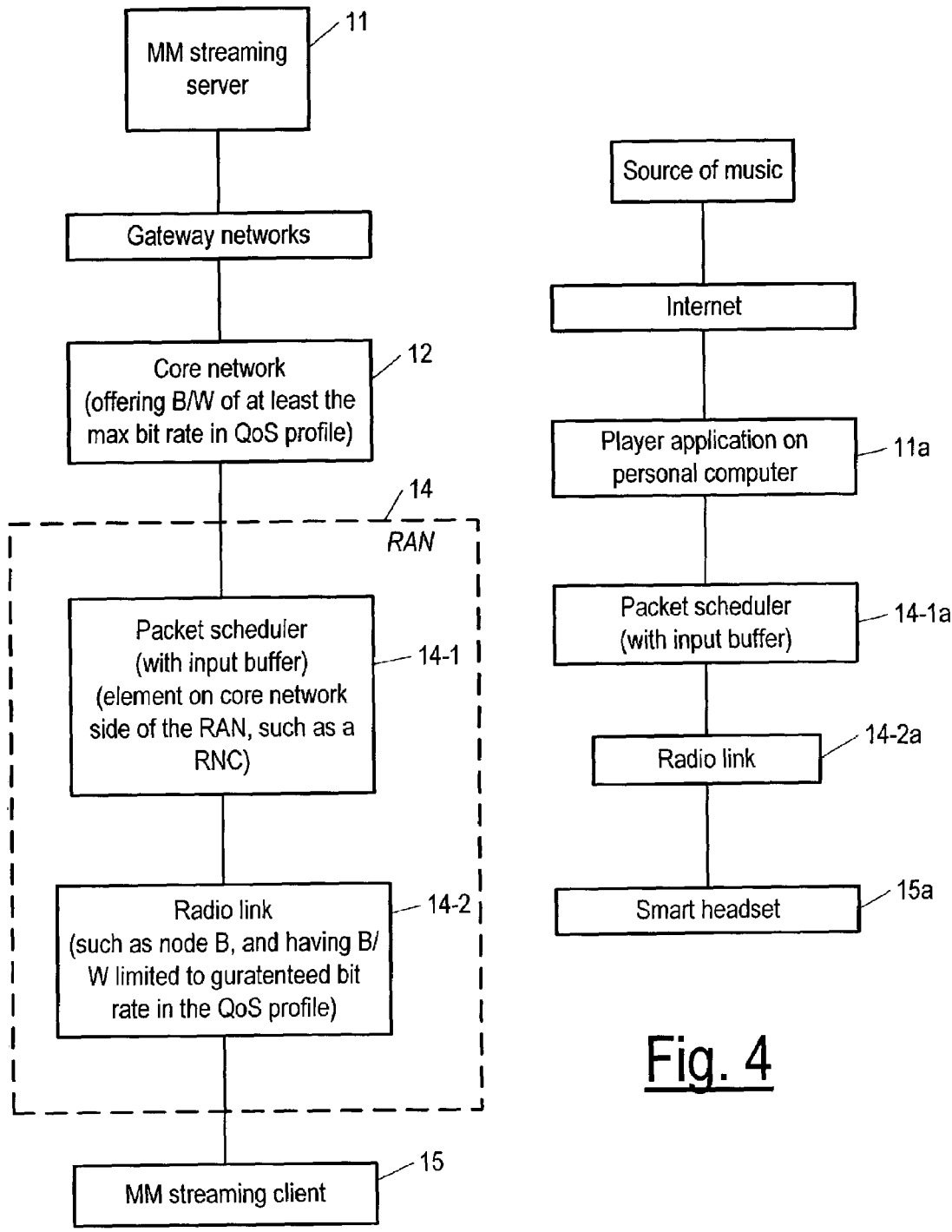
FIG. 1 is a block diagram showing a server communicating packets of multimedia to a client over a bottleneck path link with a packet scheduler (using a buffer) feeding packets onto the bottleneck path link at as high a rate as the bottleneck path link permits.
Figure 2:
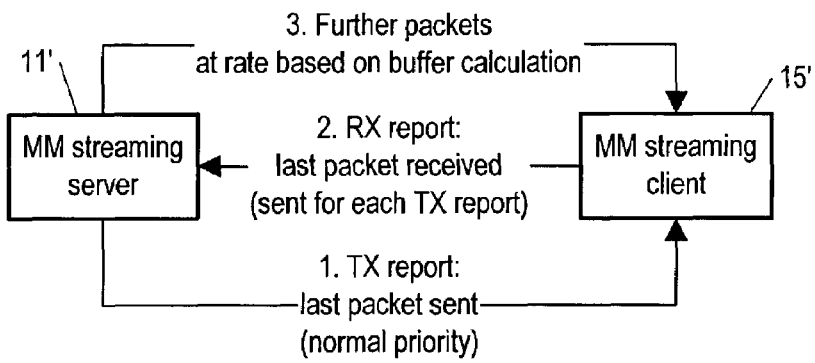
FIG. 2 is a block diagram showing the principal communication flows between the server and the client of FIG. 1 relative to controlling the rate at which packets arrive at the packet scheduler, according to the prior art.

Referring to FIG. 1, the invention provides a measurement of how much is in the buffer of a packet scheduler 14-1 in case of a multimedia (MM) streaming server 11 providing streaming multimedia to a wireless streaming client 15 via a core network (CN) 12 and a radio access network (RAN) 14 including the packet scheduler 14-1 and a radio path link 14-2, with the radio path link 14-2 having typically lower bandwidth than other segments of the communication path connecting the streaming server 11 to the streaming client 15, and so called here a bottleneck path link. The streaming multimedia is provided as a sequence of packets which travel at different rates (in terms of throughput, i.e. bit rate) over the different path links of the communication path. As the bottleneck, the radio path link 14-2 is the path link over which the packets travel at the slowest rate and over which the throughput has the greatest variability, and the packet scheduler 14-1 feeds packets to the radio link 14-2 at a rate depending on the current throughput as determined based on handshaking between the radio link elements 14-2 and the packet scheduler 14-1. In the downlink (from server 11 to client 15), the packet scheduler, in turn, receives packets at a rate that depends on the rate at which the server 11 provides packets. Since the packet scheduler 14-1 cannot always immediately transmit a packet it receives, but must wait until receiving an indication it is OK to send another packet through the radio link 14-2, it must buffer packets. To optimize the throughput over the radio link 14-2, the packet scheduler should always have a packet ready to send over the radio link 14-2 as soon as it receives an indication it is OK to do so. Thus, ideally, the buffer of the packet scheduler always holds some bytes (i.e. some packets), but new packets do not ever arrive so fast as to overflow the buffer. To avoid overflow, and also to ensure that the buffer of the packet scheduler always holds at least some bytes, the server 11 should adjust its rate of transmission to accommodate the packet scheduler rate of transmission.

The packet scheduler is an element of the RAN infrastructure on the CN side of the RAN; for example, it is a base station controller in a GSM RAN, or it is a radio network controller in a UTRAN (Universal Terrestrial Radio Access Network).

Figure 3A:
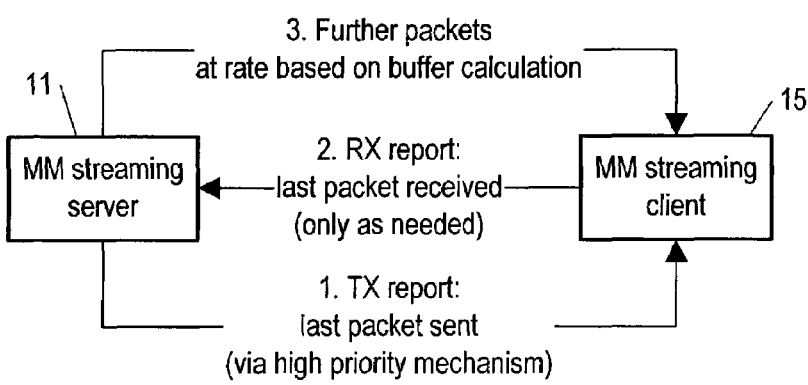
FIG. 3A is a block diagram showing the principal communication flows between the server and the client of FIG. 1 relative to controlling the rate at which packets arrive at the packet scheduler, according to a first embodiment, in which the client sends back to the server the last packet received, but usually only when necessary (when the buffer of the packet scheduler is either too full or not full enough), i.e. usually only as needed.
Figure 3B:
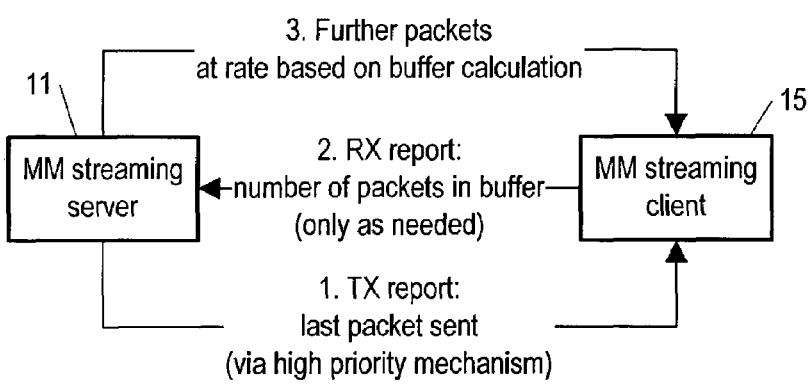
FIG. 3B is a block diagram showing the principal communication flows between the server and the client of FIG. 1 relative to controlling the rate at which packets arrive at the packet scheduler, according to a second embodiment, in which the client sends back to the server an estimate of the number of packets in the buffer of the packet scheduler, but usually only when necessary.
Figure 3C:
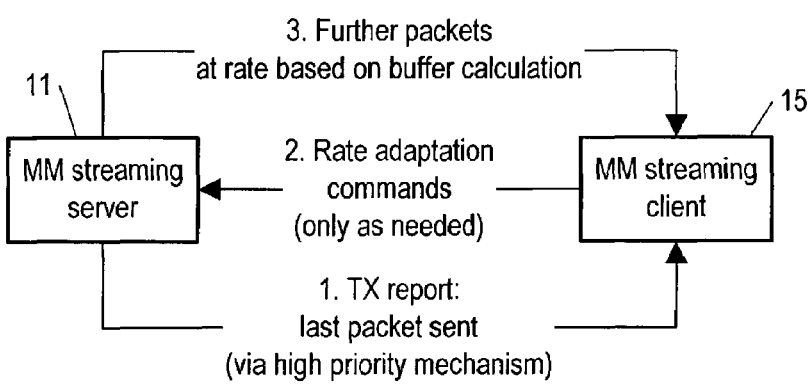
FIG. 3C is a block diagram showing the principal communication flows between the server and the client of FIG. 1 relative to controlling the rate at which packets arrive at the packet scheduler, according to a third embodiment, in which the client sends back to the server rate adaptation commands (including commands to the server to either speed up or slow down its transmission rate, or even possibly information indicating to which sessions the client is to be made a subscriber), but usually only when necessary.

Referring now also to FIGS. 3A–C, different embodiments of the invention are shown differing in how the client 15 responds to a sender report indicating the last packet sent. In each embodiment according to the invention, to make it possible for the server 11 to adjust its rate of transmission to accommodate that of the packet scheduler 14-1, from time to time the streaming server 11 transmits a sender report (message indicated as number 1 of FIGS. 3A–3C) indicating the last packet or byte number it has transmitted, and transmits the sender report in such a way as to have the sender report be transmitted over the bottleneck path link 14-2 by the packet scheduler 14-1 ahead of packets already in the buffer of the packet scheduler. One way to do this is to transmit the sender report as a high priority packet (or packets). When the sender report reaches the packet scheduler 14-1, it jumps the queue in the buffer there and so becomes the next packet the packet scheduler sends over the bottleneck path link 14-2 (the radio link) to the client 15, arriving at the client 15 before any packets that are held in the buffer of the packet scheduler 14-1. For the packet scheduler to move the sender report to the head of the buffer queue, there must be a protocol mechanism for indicating a high priority packet, or the packet scheduler must be implemented to treat all sender reports as high priority and be able to recognized an incoming packet as a sender report.

Another way to arrange that a sender report be transmitted over the bottleneck path link ahead of (almost) all RTP packets is to use two different same priority PDP-contexts, one for RTCP sender reports and the other for RTP packets, since each PDP context has its own queue and each packet at the head of a queue is scheduled by the packet scheduler 14-1 for communication over the bottleneck path link 14-2 with the same priority as every other packet at the head of a queue. Thus, using such a scheme, when a sender report arrives at the packer scheduler 14-1, it will be sent out over the bottleneck path link 14-2 just after the first packet (if any) already at the head of the RTP queue.

When the sender report reaches the client 15, again in each embodiment the client computes how full the buffer is using the information provided in the sender report (the last packet or byte number transmitted) and taking into account the packets it has already received. Algebraically, if $n_s(t_1)$ is the packet or byte number sent as of time $t_1$ as reported by the server 11, and $n_r(t_2)$ is the number received as of time $t_2$ (later than time $t_1$), then the receiver calculates (approximately) the number $n_b$ of packets in the buffer at time $t_2$ as:

$$n_b(t_2) = n_s(t_1) - n_r(t_2). \qquad (1)$$

With the number of packets in the buffer so calculated, the client 15 can then respond in different ways, according to the different embodiments of the invention indicated in FIGS. 3A–3C, to make sure that the buffer content is kept at or near a target level. In all embodiments, however, the client communicates with the sender (as the message indicated as number 2 in FIGS. 3A–3C) usually only when necessary to adjust the size of the buffer, i.e. usually only as needed, and so the load imposed on the bottleneck path link using rate adaptation according to the invention is less than the load according to the prior art.

Now referring in particular to FIG. 3A, after calculating the buffer size $n_b(t_2)$, if the buffer size must be adjusted (by the server 11 either slowing or increasing the rate of transmission of packets to the packet scheduler 14-1), the client 15 transmits to the server 11 in a receiver report the last byte received. The server then will calculate for itself the buffer size and see for itself that the transmission rate must be adjusted. This embodiment makes use of the existing protocol standard in which a receiver report transmits the last byte received.

Referring now in particular to FIG. 3B, in a second embodiment, after calculating the buffer size $n_b(t_2)$, if the buffer size must be adjusted, the client 15 transmits to the server 11 in a receiver report not the last byte received, but the results of its buffer size calculation, i.e. $n_b(t_2)$. The server then sees, without further calculation, that the transmission rate must be adjusted.

Referring now to FIG. 3C, in a third embodiment, instead of having the client 15 send the measurement results to the server 11 as in the second embodiment, the client 15 performs the rate adaptation by itself by sending to the server 11 not measurement results or the last byte received, but rather actual rate adjustment commands, but again, and obviously in this embodiment, usually only when such commands are necessary.

Besides the embodiments indicated above in which the client itself does the rate adaptation (FIG. 3C), there are other ways for the client to do rate adaptation by itself once it calculates the buffer size. For example, a receiver (client) driven scheme can be used in which the streaming multimedia is sent on multiple layers in multiple RTP sessions and the client is able to select which sessions to receive. The signaling of the session dependency (some layers/sessions have others that depend on them, and only a layer/session having none that depend on it can be dropped) and the way to command the layer selection can be done in different ways. One way is to transmit each RTP session to a separate IP multicast port; then the client can simply subscribe to one or another of the multicast ports or can drop a multicast port. (In the layered multicast scheme, only packets of sessions subscribed to by the client (15) reach the packet scheduler (14-1); other packets, although transmitted by the server (11), are blocked and so not forwarded by the last hop multicast-aware router before the packet scheduler (14-1). Thus, by choosing which sessions to subscribe to, the client (15) is able to control the load on the bottleneck path link (14-2).)

The invention is of use not only for adapting the rate at which the packet scheduler sends packets to the streaming client 15, but also in a context where retransmitted data packets are to be sent with high priority. It is worth noting that when a prioritized RTCP sender report transmission is used (as in any of the embodiments of the invention, and so as shown in FIGS. 3A–3C), the server 11 has available a measurement of the round-trip delay, a measurement that excludes the queuing delay for RTP packets in the downlink packet scheduler buffer. Such a measurement can be useful where priority sending is used for RTP retransmitted packets, because with the measurement the server (11) can better estimate the arrival time at the client (15) of the RTP retransmission packet and not retransmit a packet when the packet would arrive too late at the client (and so be discarded). (The client 15 will ignore any retransmitted packet that does not reach it within a predetermined maximum delay, sometimes called a delay budget. If the server 11 knows that the client's delay budget for a packet will expire during retransmission (i.e. that it will be played out in less than the one-way time for downlink), the server can simply not retransmit the packet, and so avoid imposing useless load on the bottleneck path link 14-2.)

Although the invention has been shown and described for an arrangement in which a bottleneck path link 14-2 leading from a server device 11 (providing streaming multimedia) to a client device 15 is immediately preceded by a packet scheduler using a buffer, the invention should be understood to be of use in any arrangement in which such a server device is separated from a client device by a bottleneck path link, and, in addition, a packet scheduler, located anywhere before the bottleneck path link, uses a buffer, located anywhere accessible to the packet scheduler, to hold packets or other information units, as needed, so as to transmit the packets over the bottleneck path link at the rate supported by the bottleneck path link. The packet scheduler need not immediately precede the bottleneck path link, and the buffer need not be integral with the packet scheduler, but can be hosted by a peripheral device accessible to the packet scheduler. In addition, there are even embodiments in which the server is also the packet scheduler, as described next.

Referring now to FIG. 4, an arrangement is shown in which a terminal device, namely a player application 11a hosted by a personal computer connected over the Internet to a source of music, wirelessly communicates the music to a smart headset 15a over a bottleneck path link 14-2a (a radio link) via a packet scheduler 14-1a also hosted by the personal computer or a peripheral device attached to the personal computer. Here, the player application 11a performs the role of the server 11 of FIGS. 1 and 3A–3C, and the smart headset 15a plays the role of the client 15 of FIGS. 1 and 3A–3C.

SCOPE OF THE INVENTION

It is to be understood that the above-described arrangements are only illustrative of the application of the principles of the present invention. In particular, it should be understood that the client carrying out the buffer size calculation can be not only a terminal, but also any other element after the bottleneck path link. Numerous modifications and alternative arrangements of what is disclosed here may be devised by those skilled in the art without departing from the scope of the present invention, and the appended claims are intended to cover such modifications and arrangements.

What is claimed is:

1. A method, comprising:
   a server communicating sender information to a client device over a communication path used by the server for communicating information units, the communication path including a packet scheduler followed by a bottleneck link path, the packet scheduler having a buffer for holding the information units as needed, the sender information indicating a last information unit sent to the client, and the server communicating the sender information via a mechanism by which the sender information is communicated over the bottleneck path link ahead of information units already in the buffer of the packet scheduler but not already scheduled to be communicated;
   the client performing a buffer-size calculation, using the last information unit sent to the client as indicated by the sender information, to estimate the number of information units in the buffer, and using the result of the buffer-size calculation to provide information useful in effecting rate adaptation to control the number of information units in the buffer; and
   the client communicating to the server over the bottleneck path link the information useful in effecting rate adaptation to control the number of information units in the buffer.

2. The method of claim 1, wherein the communicating over the bottleneck path link of the information useful in effecting rate adaptation is performed or not depending on whether the buffer-size calculation indicates that the buffer size is outside of predetermined limits.

3. The method of claim 1, wherein the mechanism by which the sender information is communicated over the bottleneck path link results in the sender information being communicated ahead of all information units already in the buffer of the packet scheduler except for the next unit of information in the buffer already scheduled to be communicated over the bottleneck path link at the time of arrival of the sender information.

4. The method of claim 1, wherein the information useful in effecting rate adaptation indicates at least either rate adaptation commands or the last information unit received or the buffer size or sessions to which the client is to be made a subscriber.

5. The method of claim 1, wherein the server uses the rate adaptation information to determine an estimate of the time for an information unit to reach the client over the bottleneck path link after being transmitted from the server.

6. A client device, comprising:
   means for receiving information units communicated by a server over a communication path leading from the server to the client device, said communication path including a packet scheduler followed by a bottleneck link path, the packet scheduler having a buffer for holding information units as needed, and for receiving sender information indicating the last information unit sent to the client by the server;
   means for performing a buffer-size calculation to estimate the number of information units in the buffer using the sender information, and for then communicating over the bottleneck path link information useful in effecting rate adaptation to control the number of information units in the buffer based on the buffer size calculation, wherein the client is capable of receiving the sender information over the bottleneck path link ahead of information units already in the buffer of the packet scheduler but not already scheduled to be communicated.

7. The client of claim 6, wherein the information useful in effecting rate adaptation indicates at least either rate adaptation commands or the last information unit received or the buffer size or sessions to which the client is to be made a subscriber.

8. A system, comprising a server, a client, a packet scheduler and a bottleneck path link, the system for communicating information units from the server to the client over a communication path leading from the server to the client with said communication path including the packet scheduler followed by the bottleneck link path, the packet scheduler having a buffer for holding the information units as needed, wherein:
   the server is capable of communicating to the client sender information indicating the last information unit sent to the client and to do so via a mechanism by which the sender information is communicated over the bottleneck path link ahead of information units already in the buffer of the packet scheduler but not already scheduled to be communicated; and
   the client is capable of performing a buffer-size size calculation using the sender information, to estimate the number of information units in the buffer; and the client is capable of determining information useful in effecting rate adaptation to control the number of information units in the buffer based on the buffer size calculation and to communicate the information over the bottleneck path link.

9. The system of claim 8, wherein whether the information useful in effecting rate adaptation is communicated over the bottleneck path link depends on whether the buffer-size calculation indicates that the buffer size is outside of predetermined limits.

10. The system of claim 8, wherein the mechanism by which the sender information is communicated over the bottleneck path link is capable of communicating the sender information ahead of all information units already in the buffer of the packet scheduler except for the next unit of information in the buffer already scheduled to be communicated over the bottleneck path link at the time of arrival of the sender information.

11. The system of claim 8, wherein the information useful in effecting rate adaptation indicates at least either rate adaptation commands or the last information unit received or the buffer size or sessions to which the client is to be made a subscriber.

12. The system of claim 8, wherein the server is capable of using the rate adaptation information to determine an estimate of the time for an information unit to reach the client over the bottleneck path link after being transmitted from the server.

13. A computer program, for providing instructions for a client so as to impart to the client operability as claimed in claim 6.

14. A computer program, for providing instructions for a system so as to impart to the system operability as claimed in claim 8.

15. A method, comprising:
a client device performing a buffer-size calculation, using a last information unit indicated in sender information sent to the client by a server over a communication path used by the server for communicating information units, the communication path including a packet scheduler followed by a bottleneck link path, the packet scheduler having a buffer for holding the information units as needed, the client device using the last information unit indication to estimate the number of information units in the buffer, and using the result of the buffer-size calculation to provide information useful in effecting rate adaptation to control the number of information units in the buffer; and
the client device communicating to the server over the bottleneck path link the information useful in effecting rate adaptation to control the number of information units in the buffer.

16. The method of claim 15, wherein the communicating of the information useful in effecting rate adaptation is performed or not depending on whether the buffer-size calculation indicates that the buffer size is outside of predetermined limits.

17. The method of claim 15, wherein the information useful in effecting rate adaptation indicates at least either rate adaptation commands or the last information unit received or the buffer size or sessions to which the client is to be made a subscriber.

18. A client device, comprising:
a receiver, for receiving information units communicated by a server over a communication path leading from the server to the client device, said communication path including a packet scheduler followed by a bottleneck link path, the packet scheduler having a buffer for holding information units as needed, and for receiving sender information indicating the last information unit sent to the client by the server; and
a computing component, for performing a buffer-size calculation to estimate the number of information units in the buffer using the sender information, and for then communicating over the bottleneck path link information useful in effecting rate adaptation to control the number of information units in the buffer based on the buffer size calculation.

19. The client device of claim 18, wherein the processor is configured to communicate the information useful in effecting rate adaptation depending on whether the buffer-size calculation indicates that the buffer size is outside of predetermined limits.

20. The client device of claim 18, wherein the information useful in effecting rate adaptation indicates at least either rate adaptation commands or the last information unit received or the buffer size or sessions to which the client is to be made a subscriber.

* * * * *

UNITED STATES PATENT AND TRADEMARK OFFICE
CERTIFICATE OF CORRECTION

PATENT NO. : 7,190,670 B2  
APPLICATION NO. : 10/265077  
DATED : March 13, 2007  
INVENTOR(S) : Victor Varsa et al.

It is certified that error appears in the above-identified patent and that said Letters Patent is hereby corrected as shown below:

In column 8, line 63, claim 8, line 16, please delete "buffer-size size" and substitute --buffer-size --.

Signed and Sealed this

Fourteenth Day of August, 2007

JON W. DUDAS  
*Director of the United States Patent and Trademark Office*